Nov 2, 1937.   G. E. EDMUNDS   2,097,970
WHEEL MOUNTING
Filed Nov. 4, 1935     5 Sheets-Sheet 2
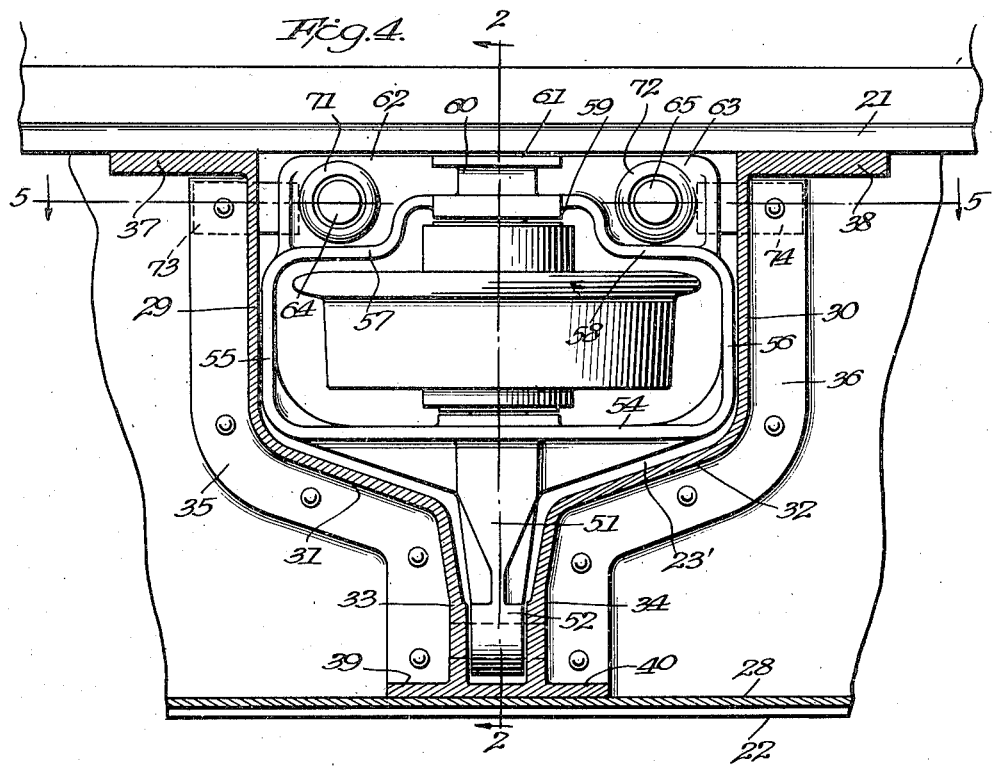
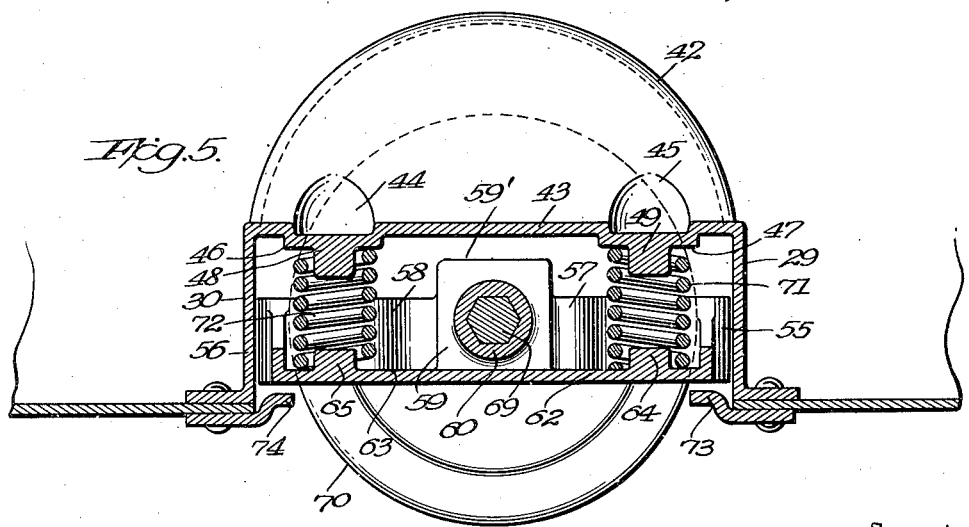
Inventor
Glenn E. Edmunds
By Cushman Derby Cushman
Attorneys

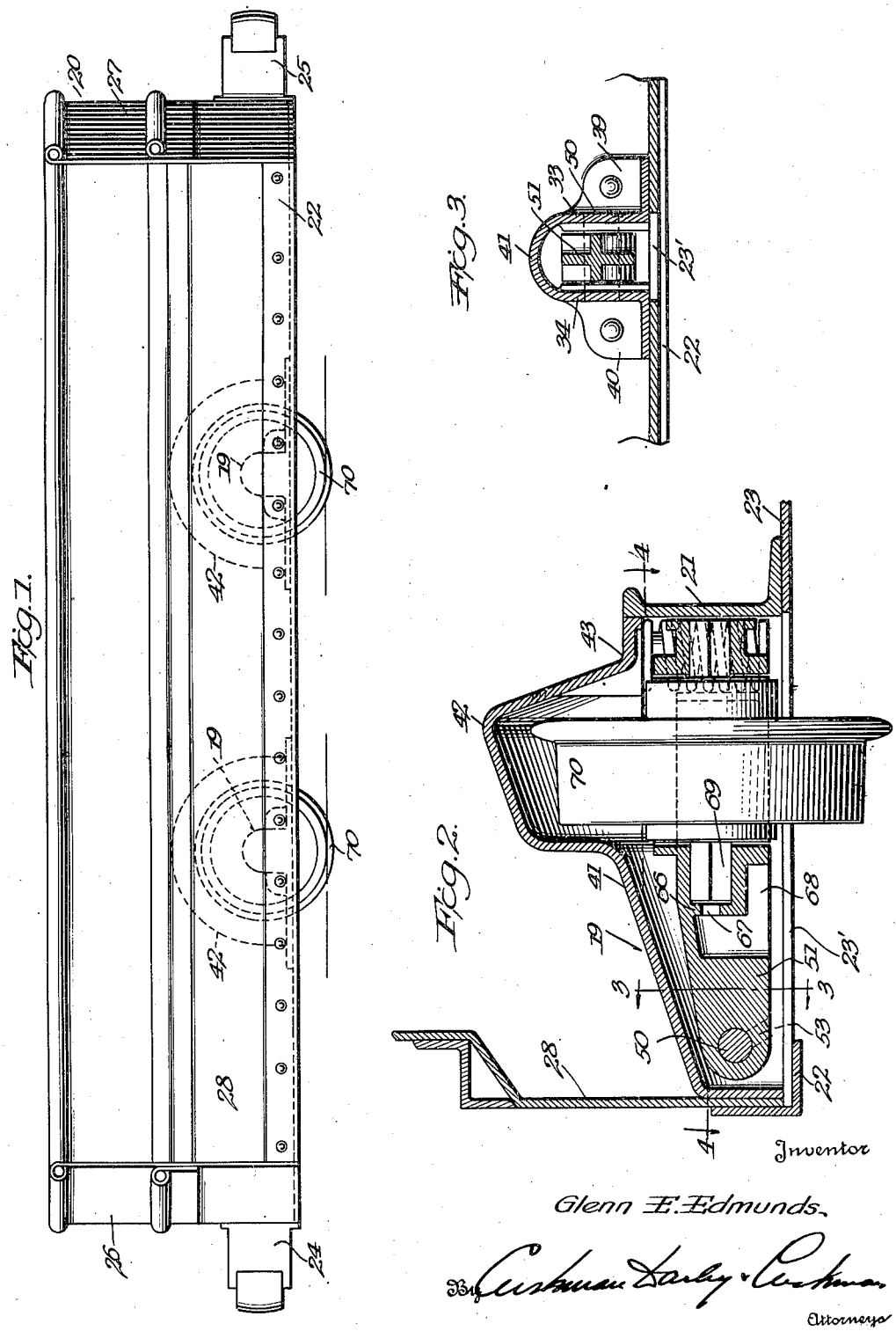

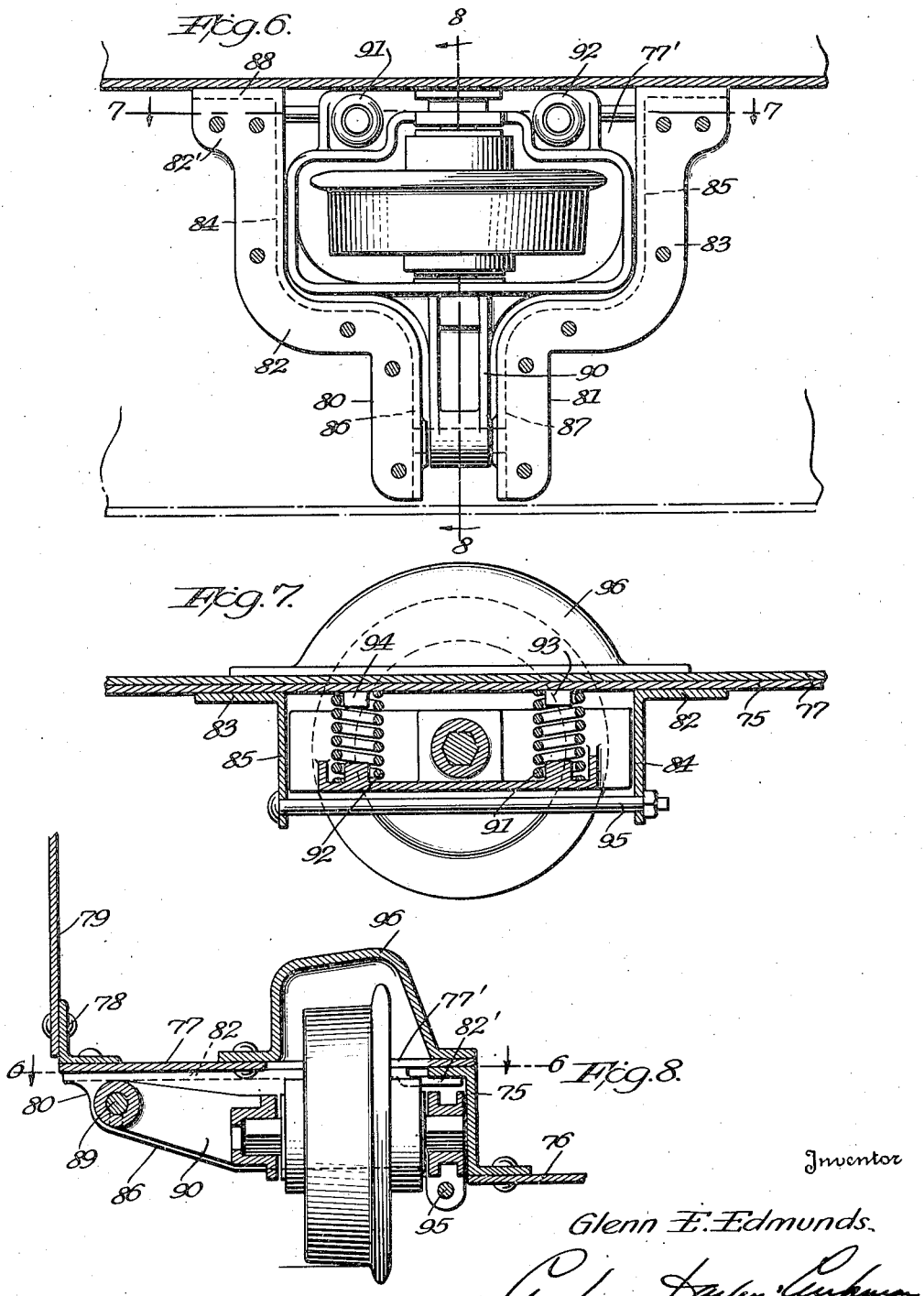

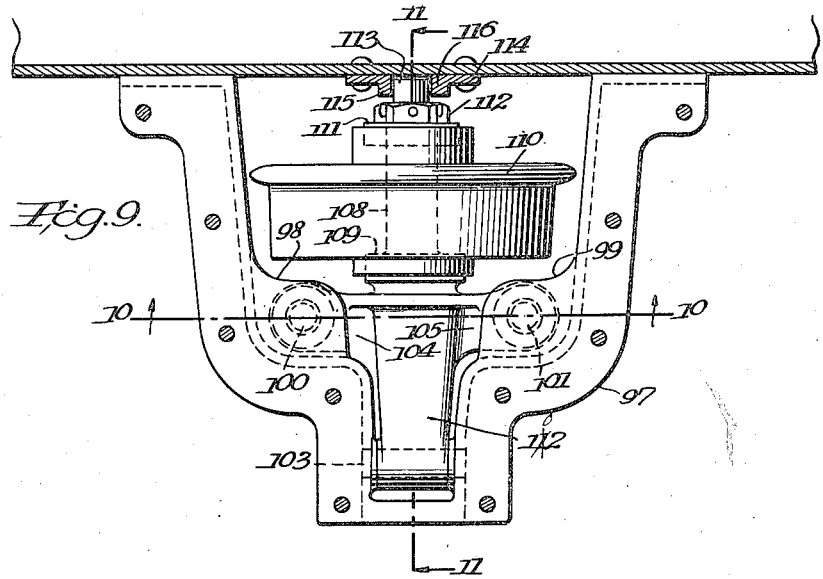
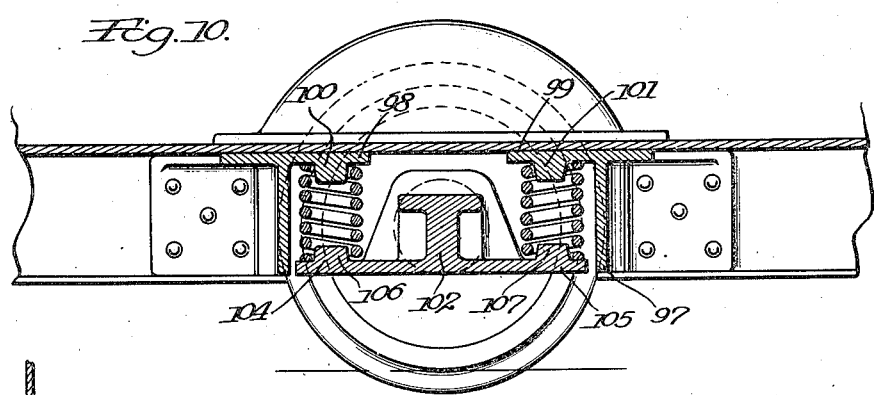
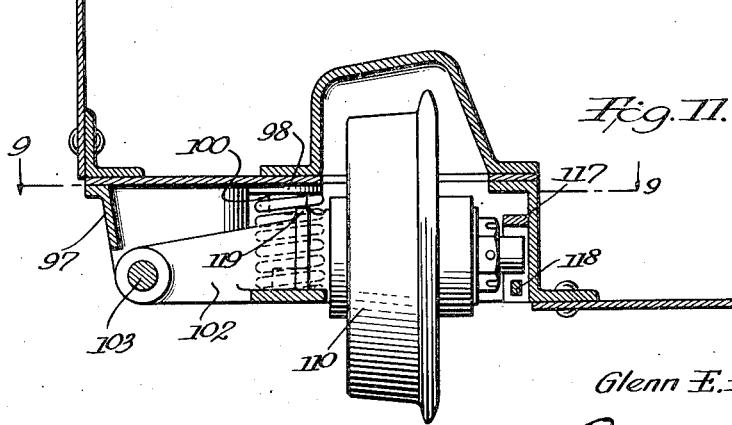

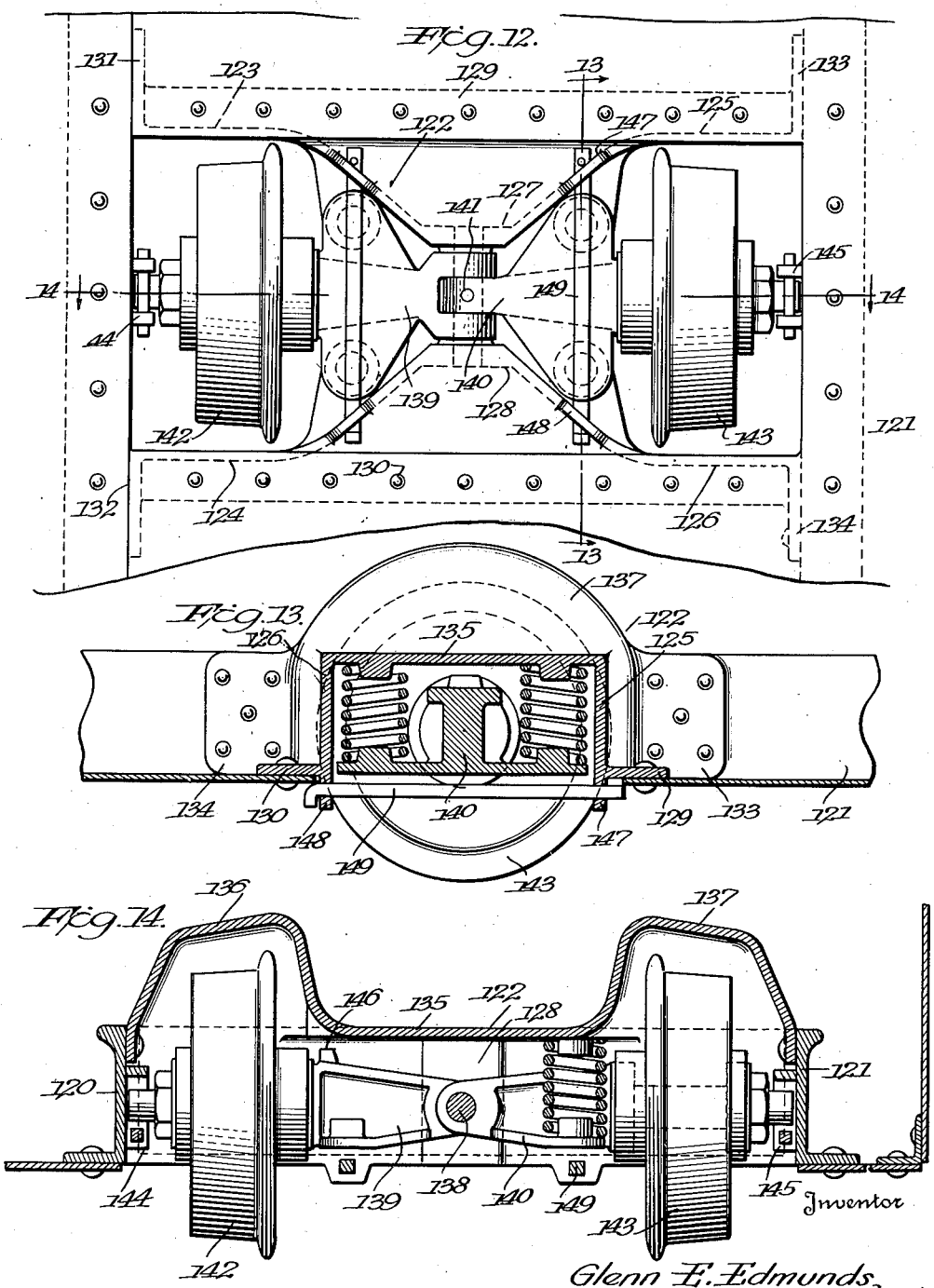

Patented Nov. 2, 1937

2,097,970

UNITED STATES PATENT OFFICE 2,097,970

WHEEL MOUNTING

Glenn E. Edmunds, Columbus, Ohio, assignor to The Bonney-Floyd Company, Columbus, Ohio, a corporation of Ohio Application November 4, 1935, Serial No. 48,233

12 Claims. (Cl. 105—364)

The present invention relates to independently sprung wheel mountings for vehicles and has particular application to vehicles such as mine cars, mine locomotives and so forth, although not limited in this respect.

In my Patent No. 1,974,018, issued September 18, 1934, I have disclosed spring wheel mountings wherein each wheel is mounted on an independent arm which is swingable on an axis extending transversely of the vehicle.

It is a principal object of the present invention to provide wheel mounting means including an arm swingable on an axis extending longitudinally of the vehicle. such disposition having the particular advantage of enabling certain economies in space to be realized.

In the accompanying drawings I have shown illustrative embodiments of the invention as applied by way of example, to mine cars, and further description will be made with reference to these drawings in which:

Figure 1 is a side elevation of a mine car with one embodiment of the invention applied thereto.

Figure 2 is a section of a wheel mounting unit substantially on the line 2—2 of Figure 4.

Figure 3 is a section substantially on line 3—3 of Figure 2.

Figure 4 is a section substantially on line 4—4 of Figure 2.

Figure 5 is a section substantially on line 5—5 of Figure 4.

Figure 6 is a view substantially on line 6—6 of Figure 8 of a modified form of wheel mounting unit.

Figure 7 is a section substantially on line 7—7 of Figure 6.

Figure 8 is a section substantially on line 8—8 of Figure 6.

Figure 9 is a plan view of a further modified form of wheel mounting unit.

Figure 10 is a section substantially on line 10—10 of Figure 9.

Figure 11 is a section substantially on line 11—11 of Figure 9.

Figure 12 is a bottom plan view of a still further modified form of wheel mounting unit.

Figure 13 is a section substantially on line 13—13 of Figure 12, and

Figure 14 is a section substantially on line 14—14 of Figure 12.

Referring first to Figures 1 to 5 of the drawings, reference numeral 20 designates generally a mine car having an under-structure including a pair of main sills as at 21, a pair of auxiliary sills 22 spaced outwardly of the main sills, a floor 23, wheel mounting frames as at 19 disposed above the floor and between the main and auxiliary sills, and end sills 24 and 25 which may be in the form of bumper housings. The main sills may be bulb flanged angle beams as shown and the auxiliary sills may be in the form of heavy angle bars as indicated. The floor 23 is substantially uniplanar throughout, the car in this respect being similar to that disclosed in my copending application Serial No. 550,581, filed July 13, 1931. The floor underlies the bottom horizontal flanges of the main sills and is riveted thereto, its lateral edges overlying the inwardly turned horizontal flanges of the auxiliary sills and secured thereto. The main sills are connected by the end sills 24 and 25 and these latter, or at least one of them may be in the form of bumper housings of the nature of those disclosed in my copending application Serial No. 524,737, filed March 23, 1931.

The body comprises end walls 26 and 27 and side walls as at 28, the lower marginal portions of the side walls being riveted inside the vertical legs of the auxiliary or outer sills.

The side floor portions between the main and auxiliary sills are provided with four wheel openings as at 23', each of these openings being so shaped that the floor margins will underlie the bottom flanges of a wheel mounting frame or unit 19.

The unit 19 comprises horizontally spaced vertical side walls including relatively widely spaced parallel portions 29 and 30, converged portions 31 and 32 and outer relatively closely approached portions 33 and 34. The side wall portions have bottom flanges 35 and 36 which overlie the floor margins at the wheel opening 23' and are riveted thereto. Walls 29 and 30 and flanges 35 and 36 merge in flanges 37 and 38 lying against the outer face of sill 21 and riveted thereto. The wall portions 33 and 34 and the outer ends of flanges 35 and 36 merge into flanges 39 and 40 which lie against the lower marginal portion of the side wall 28 to be riveted therethrough to the vertical leg of angle 22. The frame thus constituted provides a rigid connection between the main and auxiliary sills and serves as a floor support. The frame is completed by a cover 41 which joins the side wall portions and extends between the main and auxiliary sills, the cover as here shown being gradually inclined upwardly and inwardly from the relatively low side wall portions 33, 34 and then abruptly upwardly, inwardly and downwardly to form a wheel housing portion 42, there being a substantially horizontal portion 43 immediately adjacent the main sill. The lower portion of the inner wall of housing 42 has inwardly off-set portions 44 and 45 and at these points portion 43 is somewhat downwardly offset to form spring seats 46 and 47, these being provided with centering bosses 48 and 49.

I prefer to form the described frame and housing as an integral steel casting, but the invention is not limited in this respect, since the unit may be built up of shapes.

The frame side wall portions 33 and 34 are provided with aligned circular openings in which are journalled the ends of a pin 50 whose axis is parallel to the longitudinal axis of the car. An arm 51 has a terminal boss 52 bored to receive pin 50, the pin being secured in the bore against longitudinal displacement by means of the set screw 53, Figure 2. Arm 51 extends transversely of the car between side wall portions 33 and 34 and therebeyond is expanded into a wheel receiving yoke portion. This yoke portion comprises a vertical wall 54 parallel to the axis of pin 53 and merging at its ends into vertical walls 55 and 56 which lie closely adjacent walls 29 and 30. Walls 55 and 56 merge into wall portions 57 and 58 parallel to wall 54, these wall portions being connected by an outwardly off-set wall portion 59 likewise parallel to wall 54. Wall portion 59 is inwardly thickened as shown, and is formed with an outwardly extending neck 60 terminating in a flange 61 which lies adjacent sill 21. Portions 58 to 61 are connected at their lower edges by horizontal flange portions 62 and 63 which terminate outwardly in the outer vertical plane of flange 61 and provide spring seats having formed thereon centering bosses 64 and 65 beneath bosses 49 and 48 respectively. The described yoke is preferably formed as an integral steel casting and its described component parts may be connected by strengthening gussets as indicated in the drawings.

Wall portion 59, extension 60 and flange 61 are provided with a through bore having an axis parallel to a plane perpendicular to the longitudinal axis of the car, a similar aligned bore being formed in the central inwardly thickened portion of wall 54. The latter bore has at its end adjacent pin 50 an annular abutment 66, a knock-out opening 67 being accessible through a recess 68 in the bottom of arm 51.

A stub axle 69 is received in the described bores, longitudinal displacement of the axle being limited on the one hand by rib 66 and on the other by sill 21. The axle may be of polygonal section and in this case the bores will be of the same section. The axle carries a flanged wheel 70 and in the case of a polygonal axle the bearing provisions will preferably be those described in my copending application Serial No. 599,552, filed March 17, 1932.

Interposed between the opposed spring seats are compression springs 71 and 72, movement of the spring seats away from each other being limited by means of lugs 73 and 74 secured beneath the floor margins and projecting into opening 23' beneath flanges 62 and 63.

Assembly may be accomplished in different ways. Preferably, the frames 19, in the absence of the yokes, are riveted in position, whereupon the yokes may be placed in position and the pins 50 inserted and secured. The springs are then placed and compressed and lugs 73 and 74 then secured in position. The disposition may be such that with the car unloaded the wheels will be somewhat inwardly canted, coming inwardly to or somewhat past vertical planes when the car is loaded. Movement of the underframe and yoke toward each other is suitably limited as by abutment of an upwardly extending portion 59' of yoke wall 59 with the bottom of wall 43.

The distance between the pivoting axes of the yokes to their respectively associated wheels, is relatively great so that the bottoms of the wheels swing in a relatively wide arc and through no very great distance. The downward swinging range of the yokes is so limited by the lugs 73 and 74 that the wheel flanges can never tend to climb the rails. The frame walls 29 and 30 provide vertical guide surfaces for the yoke walls 55 and 56 so that the yoke pivot pins are relieved of bending stresses. The flanges 61 are sufficiently spaced from the main sills so as not to interfere therewith.

In the construction just described, the frames 19 extend between the inner and outer sills for the express purpose of providing great rigidity. This lateral extension of the frames is taken advantage of in the described embodiment to house the yoke arms so that the various features cooperate to enable economy in lading room to be realized.

In Figures 6 to 8, the invention is shown as applied to a car having side floor portions outwardly of the main sills elevated above the central floor portions, this type of car being shown also in my Patent 1,974,018, above mentioned.

To refer to Figures 6 to 8, reference numeral 75 designates the main sill in the form of a Z-bar having an inwardly directed bottom flange and an outwardly directed top flange. A central floor portion 76 is supported by the bottom flange, the top flange supporting the inner marginal portion of a side floor portion or flare plate 77. The horizontal flange of an angle sill 78 is secured to the top outer marginal portion of the flare plate, a side wall 79 being secured to the vertical flange of the outer sill. A pair of members 80 and 81 constitute a frame shaped substantially as the frame 19, above described. Members 80 and 81 have top flanges 82 and 83 riveted beneath the flare plate and along the end margins of a wheel opening 77' formed in the flare plate adjacent sill 75. The frame members present the parallel depending relatively widely spaced wall portions 84 and 85 and the relatively closely approached outer wall portions 86 and 87. Toward the main sills flange 82 is expanded and downwardly off-set to extend beneath, as at 82', and be riveted to the top flange of the main sill. Portion 82' and wall 84 merge in a flange portion 88 riveted against the vertical portion of the main sill. The outer extremity of flange 82 is riveted through the flare plate to the horizontal flange of the auxiliary sill 78. Member 81 is similarly secured to the inner and outer sills. Wall portions 86 and 87 provide bores for a pin 89 on which is mounted the arm 90 of a wheel carrying yoke which is substantially the same as that heretofore described. In the present case, however, it will be noted that the arm 90 is vertically slotted and somewhat downwardly inclined to the yoke portion, the slot providing free access to the knock-out aperture. The springs 91 and 92 seat upwardly against the lower surface of the top flange of the main sill and this flange may be locally outwardly expanded, if necessary, to provide proper seats, centering bosses 93 and 94 being secured on the seats as by welding. Adjacent the main sill, walls 84 and 85 have downwardly projecting ears pierced to receive a bolt 95 which underlies the inner extremity of the yoke to limit movement apart of the yoke and underframe. Movement together of the two is limited through abutment of the inner yoke extremity with the bottom of the top sill flange. The wheel opening is closed upwardly by means of a hood 96.

It will be understood that the principle of operation of the embodiment just described is exactly the same as that of the first, the only differences being of a structural nature to accommodate a different car design.

In Figures 9 to 11 the same type of car is contemplated as in Figures 6 to 8. The frame 97 is generally the same as the frame constituted by members 80 and 81, two such members being shown as integrally connected at their outer ends to form the frame 97. The frame 97 includes inwardly projecting flanges 98 and 99 in the corners at the outer ends of the main side walls of the frame, these flanges immediately underlying the flare plate and constituting spring seats with centering bosses 100 and 101. An arm 102 pivotally mounted between the outer frame side walls on a pin 103 has lateral flanges 104 and 105 beneath flanges 98 and 99 provided with spring centering bosses 106 and 107 opposite bosses 100 and 101. The inner end of arm 102 is machined to provide an integral axle journal portion 108 having thereon an integral dust collar 109 which may be peripherally grooved in the usual manner. A wheel 110 mounted on the journal portion is retained by means of a dust collar 111 and a nut 112 threaded on the journal portion, the nut and dust collar being preferably integral and serving to retain the usual anti-friction bearings in position. The extremity 113 of the journal portion is reduced and is received in the U-shaped saddle 114 which has the vertical guide ribs 115 and 116 and the top cross portion 117, the lower ends of ribs 115 and 116 being pierced to receive a pin 118. Ribs 115 and 116 serve as vertical guides for the extremity 113 and the cross portion 117 serves to limit movement of the arm and under-structure toward each other. Such movement may also be positively limited through abutment of the top edge 119 of the arm with the overlying floor portion. Pin 118 limits movement of the under-structure and arm apart.

The described mounting is advantageous in that the journal portion is economically formed integral with the arm. The entire assembly is of very simple design and extremely compact, its operation being the same in principle as described in connection with the first embodiment.

The embodiment illustrated in Figures 12 to 14 is applicable to any type of car, since the supporting frames are confined entirely between the main sills. To refer to these figures, the main sills are designated at 120 and 121 and are connected by a pair of box like frames as at 122, which, as here shown, form parts of the lading bottom. The frame 122 comprises parallel wall portions 123 and 124 and 125 and 126 adjacent sills 120 and 121 respectively. The respective walls are approached centrally of the car to provide adjacent wall portions 127 and 128. The bottom edges of the wall portions are connected on the one hand by a horizontal web 129 and on the other by a horizontal web 130 whose lower surfaces are in the bottom plane of the main sills so that the central flooring margins may be secured therebeneath. The side walls and webs merge into flanges 131, 132, 133 and 134 which are secured against the sills. The frame is downwardly open and upwardly closed by a cover portion 135 which is depressed at the central portion of the car, but rises to form wheel hoods 136 and 137 whose outer marginal portions are riveted to the sills. It will be evident that the frames constitute rigid cross sill structures and if disposed at the ends of the car they may have bumper structures or housings formed integrally therewith, the frames in any event being preferably formed as integral steel castings. As another feature, the frames may have the sills and/or flooring cast integral therewith.

Side wall portions 127 and 128 are pierced to provide bearings for the ends of pin 138, which as here shown has a pair of oppositely extending arms 139 and 140 strung thereon, the extremity of arm 140 being received in the forked end of arm 139 and the relation of the parts being maintained by a set screw 141. Arms 139 and 140 are of substantially the same construction described with reference to Figures 9 to 11, having journal portions on which are mounted wheels 142 and 143, the reduced extensions of the journal portions being received in the guide and abutment saddles 144 and 145 secured to the sills. Spring seats are formed beneath the cover wall 135 and the latter may cooperate with lugs as at 146 on the arms to limit spring compression simultaneously with the abutment members 144 and 145.

Assuming the relation of parts shown in Figure 14 to be that of an unloaded car, it will be evident that load will cause the lower surfaces of the wheels to swing outwardly. Consequently, the compression limiting abutments must come into play to prevent undue spread of the wheels, such as would cause the flanges to tend to climb the rails. The use of a single pivot pin, as shown, is preferred in order that arms 139 and 140 may be of maximum length. Under some circumstances, however, separate pins may be provided if desired. As additional means for limiting movement apart of the arms and under-structure, the frame side walls may be provided with depending ears as at 147 and 148 pierced to receive abutment pins as at 149, Figure 13, these latter being positioned beneath the spring seat portions of the arms.

Where the means for limiting movement apart of the wheels and mounting units are entirely carried by the latter, as the bolt 95, Figures 6 to 8 or the pins as at 147, Figures 12 to 14, it will be evident that the units may be assembled in their entirety previous to their association with a car. The unit is entirely self-contained in the embodiment of Figures 6 to 8, whereas in Figures 12 to 14 the guide means for the axle ends are separate from the wheel mountings proper. However it will be evident that these guide means could be formed as parts of the outer walls of the wheel hoods. Similarly, stop means as bolt 95 in Figures 6 to 8 or pin 147 in Figures 12 to 14 could be provided in the embodiment of Figures 1 to 5, etc.

The several embodiments above described are merely illustrative of the principles of the invention and not restrictive of its scope. I do not limit myself to the disclosed details of form and arrangement, the invention being defined in the following claims.

I claim:

1. In a vehicle comprising an understructure including a pair of longitudinally extending sill members, a frame extending transversely between said members and rigidly secured thereto, a yoke pivotally mounted in said frame on an axis extending longitudinally of the vehicle, a stub axle carried by said yoke in transversely extending relation to the vehicle, a wheel on said axle, said yoke comprising a cross portion on the opposite side of said wheel from said axis, and yieldable means between said cross portion and said understructure.

2. In a vehicle comprising an understructure including a main sill and an auxiliary sill spaced outwardly from said main sill, a frame extending transversely between and secured to said sills, an arm pivotally mounted at one end in said frame adjacent the outer end of the latter on an axis extending longitudinally of the vehicle, a wheel mounted on said arm, and yieldable means between said arm and said understructure.

3. In a vehicle comprising an understructure including a main sill and an auxiliary sill spaced outwardly from said main sill, a frame extending transversely between and secured to said sills, an arm pivotally mounted at one end in said frame adjacent the outer end of the latter on an axis extending longitudinally of the vehicle, a wheel mounted on said arm, yieldable means between said arm and said understructure, and fixed vertically extending guide means cooperating with said arm.

4. In a vehicle comprising an understructure including a main sill and an auxiliary sill spaced outwardly from said main sill, a frame extending transversely between and secured to said sills, said frame comprising transverse walls relatively widely horizontally spaced adjacent said main sill and relatively closely approached adjacent said auxiliary sill, a pin extending between and supported by said walls adjacent said auxiliary sill, an arm pivoted at one end on said pin and extending toward said main sill, a wheel mounted on said arm between said relatively widely spaced walls, and yieldable means interposed between said arm and said understructure.

5. Structure according to claim 4 wherein said arm is in the form of a yoke in which the wheel is received, the yoke being in vertically guided relation to the relatively widely spaced portions of said walls.

6. Structure according to claim 4 wherein a side floor portion extends between said sills at the bottom of the main sill, said floor portion being provided with an opening for said wheel, and wherein said frame is above said floor portion and secured thereto around said opening and comprises a top wall connecting said transverse walls and providing a wheel hood.

7. Structure according to claim 4 wherein a side floor portion extends between said sills at the top of the main sill, said floor portion being provided with an opening for said wheel, wherein said frame is below said floor portion and secured thereto around said opening, and wherein a hood for the wheel is secured above said floor portion.

8. Structure according to claim 4 wherein the arm has an integral journal portion at its free end on which the wheel is mounted and has an extension beyond said journal portions, fixed means being provided for vertically guiding said extension.

9. In a vehicle comprising an understructure including a pair of longitudinally extending main sills, a box-like frame extending between and secured to said sills to form a lading bottom portion, a pair of arms pivoted to the central portion of said frame on axes extending longitudinally of the vehicle and extending substantially to the respective sills, wheels mounted on said arms adjacent said sills, and yieldable means between said arms and superjacent portions of said frame.

10. In a vehicle comprising a lading body having a floor and side walls, main sills spaced inwardly from the side walls, frames extending between the sills and adjacent side walls and rigidly secured thereto and to the floor, the floor being provided with wheel openings at said frames, arms pivotally mounted in said frames on axes extending longitudinally of the vehicle, wheels mounted on said arms, and yieldable means between the arms and the vehicle body.

11. In a vehicle comprising a lading body having a floor and side walls, main sills spaced inwardly from the side walls, the floor being provided with wheel openings between the sills and side walls, wheel mounting means at each opening and each comprising a housing extending between a sill and side wall and secured thereto and to the floor margins at an opening, an arm pivotally mounted in the housing on an axis extending longitudinally of the vehicle, a wheel carried by the arm at a distance from the arm pivot, and cushion means between the arm and a superjacent portion of the housing.

12. Mounting means for vehicle wheels comprising an arm having a yoke portion with ends provided with bearing portions for the reception of a wheeled stub axle whose axis extends longitudinally of the arm, the arm having pivoting provisions whose axis is perpendicular to the vertical plane of the axle axis.

GLENN E. EDMUNDS.